United States Patent
Suzuki et al.

(10) Patent No.: US 8,667,784 B2
(45) Date of Patent: Mar. 11, 2014

(54) EXHAUST GAS PURIFICATION APPARATUS FOR A DIESEL ENGINE

(75) Inventors: Takanori Suzuki, Kariya (JP);
Yasuyuki Komada, Kariya (JP);
Hiroshi Ninagawa, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 640 days.

(21) Appl. No.: 12/907,441

(22) Filed: Oct. 19, 2010

(65) Prior Publication Data

US 2011/0094210 A1 Apr. 28, 2011

(30) Foreign Application Priority Data

Oct. 22, 2009 (JP) .................................. 2009-243398

(51) Int. Cl.
*F01N 3/00* (2006.01)

(52) U.S. Cl.
USPC .......................................................... 60/295

(58) Field of Classification Search
USPC .......................................................... 60/296
See application file for complete search history.

(56) References Cited

U.S. PATENT DOCUMENTS

| | | | |
|---|---|---|---|
| 5,050,376 | A | 9/1991 | Stiglic et al. |
| 6,708,487 | B2 | 3/2004 | Morimoto et al. |
| 7,421,837 | B2 | 9/2008 | Abe |
| 2004/0144069 | A1* | 7/2004 | Gabe et al. .................. 55/282.3 |
| 2005/0126162 | A1* | 6/2005 | Otake et al. ..................... 60/297 |
| 2008/0083212 | A1* | 4/2008 | Ament et al. .................... 60/295 |
| 2008/0249698 | A1* | 10/2008 | Yokoyama et al. ........... 701/107 |
| 2009/0025368 | A1* | 1/2009 | Sakimoto et al. ............... 60/285 |
| 2009/0084266 | A1* | 4/2009 | Yamada et al. ................. 96/135 |
| 2009/0143953 | A1* | 6/2009 | Ammineni et al. ........... 701/102 |
| 2009/0235644 | A1* | 9/2009 | Wu et al. ......................... 60/285 |
| 2009/0235649 | A1* | 9/2009 | Zhang et al. .................... 60/286 |

FOREIGN PATENT DOCUMENTS

| | | |
|---|---|---|
| EP | 1 195 508 B1 | 4/2002 |
| EP | 1 541 828 A1 | 6/2005 |
| JP | 2003-120390 A | 4/2003 |
| JP | 2003-314250 A | 11/2003 |
| JP | 2005-171876 A | 6/2005 |
| JP | 2005-299438 A | 10/2005 |
| JP | 2008-196394 A | 8/2008 |
| JP | 2009-062966 A | 3/2009 |

OTHER PUBLICATIONS

European Search Report for Application No. 10 188 058 dated Jan. 26, 2011.

* cited by examiner

*Primary Examiner* — Thomas Denion
*Assistant Examiner* — Jason Shanske
(74) *Attorney, Agent, or Firm* — Sughrue Mion, PLLC

(57) ABSTRACT

An exhaust gas purification apparatus for a diesel engine mounted on a vehicle includes a regenerative diesel particulate filter, an accumulated amount detector, an exhaust gas temperature raising unit, and a forcible regeneration control unit. The forcible regeneration control unit measures an automatic regeneration enable time in which an automatic regeneration condition for regenerating the filter is satisfied when the diesel engine is operating, determines from the automatic regeneration enable time whether the probability is high in which a regeneration will be completed without being interrupted when the automatic regeneration condition is continuously satisfied, performs automatic regeneration when determining that the probability of regeneration being completed is high.

10 Claims, 10 Drawing Sheets

|  | Measured Time | Predicted Regeneration Completion Time | Relationship | Determination | Ratio | Comparison |
|---|---|---|---|---|---|---|
| Present Cycle | $T_n$ |  | $T_n \geq Ti$ | X (or O) |  |  |
| Previous Cycle | $T_{n-1}$ |  | $T_{n-1} \geq Ti$ | X (or O) |  |  |
| Cycle Before Previous Cycle | $T_{n-2}$ | $Ti$ | $T_{n-2} < Ti$ | O (or X) | x/n (=Vw) | Vw < Vr |
|  |  |  |  |  |  |  |
|  |  |  |  |  |  |  |
|  | $T1$ |  | $T1 \geq Ti$ | X (or O) |  |  |

Regeneration Enablement Ratio Specified Value Vr: For Example, 0.8

EXHAUST GAS PURIFICATION APPARATUS FOR A DIESEL ENGINE

BACKGROUND OF THE INVENTION

The present invention relates to an exhaust gas purification apparatus for a diesel engine.

Diesel engines may be mounted on automobiles or other machines (e.g., construction machinery, farming machinery, and transportation machinery). A diesel particulate filter (DPF) may be arranged in an exhaust gas passage of a diesel engine. Particulate matter (PM) is accumulated in the DPF. A regeneration device injects fuel into the exhaust gas passage and burns the PM to regenerate the DPF. Japanese Laid-Open Patent Publication No. 2005-299438 describes an example of such a regeneration device that performs two types of regenerations. The first type is automatic travel regeneration, which automatically performs regeneration while the vehicle is traveling. The second type is manual regeneration, which is performed when a manual regeneration switch is operated while the vehicle is stopped. The regeneration of the DPF is controlled by switching between the two types of regeneration in accordance with a dilution state of oil.

More specifically, the regeneration device first obtains a regeneration occurrence coefficient Rc, which takes into account the manual regeneration occurrence, the automatic travel regeneration occurrence, and the travel distance and is obtained from the expression of (automatic travel regeneration occurrence×constant+manual regeneration occurrence× constant−constant)/travel distance. The regeneration device then compares the regeneration occurrence coefficient Rc with a predetermined value Ro to determine whether dilution is advanced. When the regeneration occurrence coefficient Rc is greater than the predetermined value Ro, the regeneration device determines that dilution is advanced, and manual regeneration is performed. When the regeneration occurrence coefficient Rc is less than or equal to the predetermined value Ro, automatic regeneration is performed when the vehicle is traveling.

Oil dilution occurs when unburned fuel, which is post-injected to perform DPF regeneration, mixes with the oil in the engine. The control described above is executed to avoid such oil dilution as much as possible. The control also reduces the burden on the user if the frequency of manual regeneration were to increase.

Normally, in a vehicle including a regeneration device for a DPF, regeneration is automatically started when PM accumulates in the DPF and regeneration becomes necessary. However, transportation machinery, such as a forklift, may be used for just a short operating time, such as five to ten minutes. In such a case, the engine may be stopped before regeneration of the DPF is completed. When the regeneration is interrupted in such a manner, the next two procedures may be taken.

(1) Continue regeneration in the next operating period, and repeat regeneration until the DPF is completely regenerated.

(2) Perform normal engine operation until the accumulated PM exceeds a regeneration threshold value, and restart regeneration when the accumulated PM exceeds the threshold value.

However, procedures (1) and (2) would both increase the occurrence of regenerations.

An increase in the occurrence of regenerations may lead to the next problems as described below.

(a) As shown in FIG. 11, the time required for raising the temperature to a temperature sufficient to burn PM increases, and additional energy becomes necessary (fuel efficiency falls). In detail, FIG. 11 shows the transition of the PM accumulation amount and the amount of fuel used for regeneration while the vehicle is traveling or operating when interruptions take place and when such interruptions do not take place. A regeneration interruption increases the time required to raise the temperature of the exhaust gas to the temperature that burns PM and prolongs the regeneration time. This increase the amount of fuel used for regeneration and lowers fuel efficiency.

(b) The time required to raise the temperature increases. Thus, in a system that performs post injection for regeneration, the time during which post injection is performed becomes long, and oil dilution reaches its limit within a short period of time.

SUMMARY OF THE INVENTION

It is an object of the present invention to provide an exhaust gas purification apparatus that completes an automatic regeneration at once without any interruptions when the vehicle is traveling or operating.

One aspect of the present invention is an exhaust gas purification apparatus for a diesel engine mounted on a vehicle. The exhaust gas purification apparatus includes a regenerative diesel particulate filter arranged in an exhaust gas passage of the diesel engine. An accumulated amount detector detects the amount of accumulated matter in the filter. An exhaust gas temperature raising unit that raises the temperature of exhaust gas. A forcible regeneration control unit raises the exhaust gas temperature with the exhaust gas temperature raising unit to forcibly burn the accumulated matter and regenerate the filter. The forcible regeneration control unit measures an automatic regeneration enable time in which an automatic regeneration condition for regenerating the filter is satisfied when the diesel engine is operating, determines from the automatic regeneration enable time whether or not the probability is high in which a regeneration will be completed without being interrupted during a single period in which the automatic regeneration condition is continuously satisfied, performs automatic regeneration while the vehicle is traveling or operating when determining that the probability of regeneration being completed is high.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be discussed with reference to the drawings.

Figure 1:
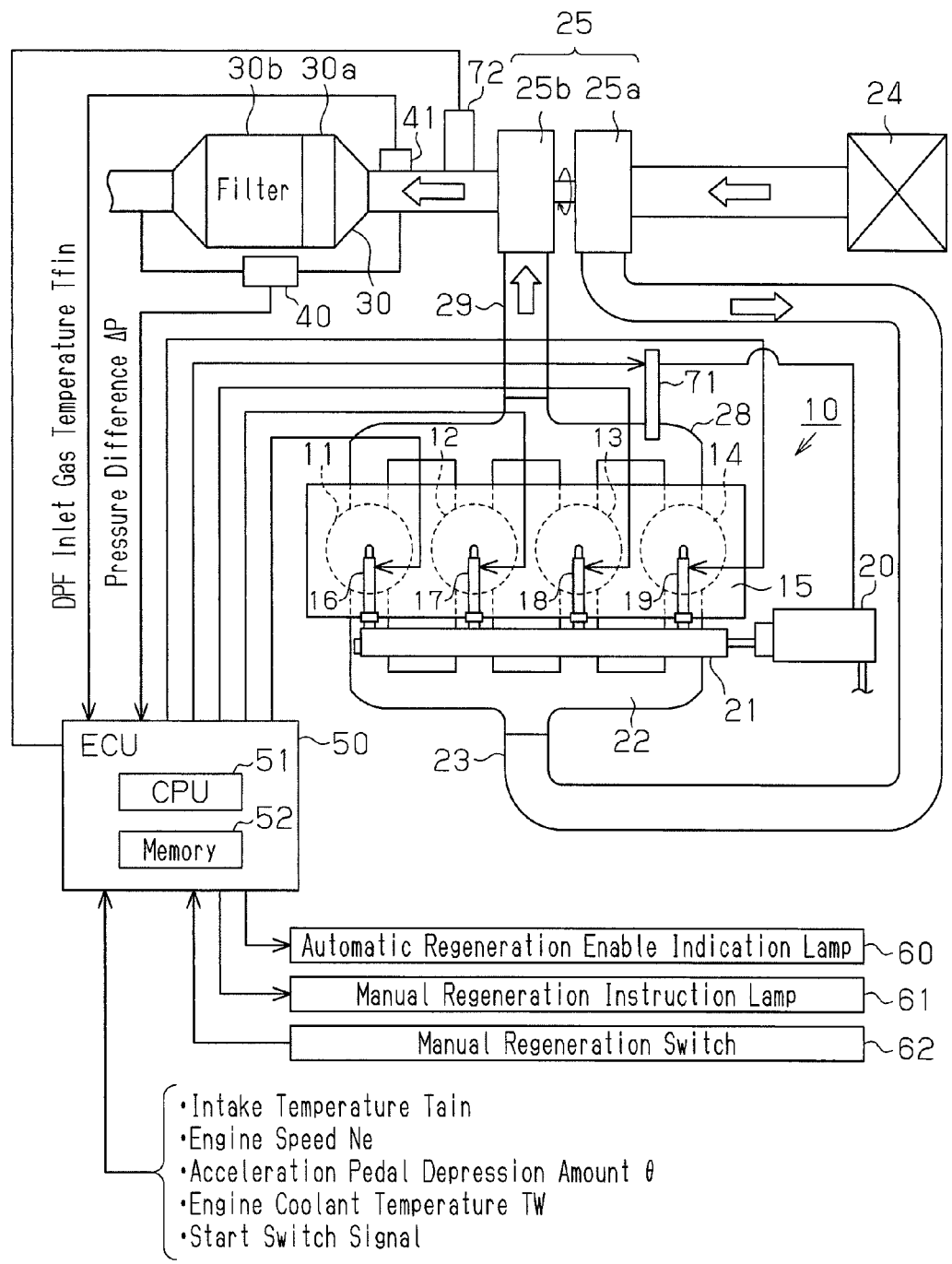
FIG. 1 is a schematic diagram showing an exhaust gas purification apparatus according to one embodiment of the present invention.

In the present embodiment, the present invention is embodied in a forklift. Referring to FIG. 1, a diesel engine 10 is mounted on the forklift (vehicle). The diesel engine 10 is driven when the forklift travels and when the forklift operates (works) to move a load. In other words, the diesel engine 10 serves as a travel and work diesel engine. An exhaust gas purification apparatus is provided for the diesel engine 10. The exhaust gas purification apparatus includes a regenerative diesel particulate filter (DPF) 30, a pressure difference sensor 40, an engine control unit (ECU) 50, and a manual regeneration instruction lamp 61.

As shown in FIG. 1, the diesel engine 10 includes a plurality of cylinders 11, 12, 13, and 14, each of which retains a piston (not shown). The piston defines a combustion chamber in the corresponding one of the cylinders 11, 12, 13, and 14. A cylinder head 15 includes fuel injection nozzles 16, 17, 18, and 19, which are respectively arranged in correspondence with the cylinders 11, 12, 13, and 14. Fuel (diesel oil) is supplied to fuel injection nozzles 16, 17, 18, and 19 via a fuel pump 20 and a common rail 21. The fuel injection nozzles 16, 17, 18, and 19 inject fuel into the combustion chamber of the corresponding one of the cylinders 11, 12, 13, and 14.

An intake manifold 22 is connected to the cylinder head 15. An intake pipe 23 is connected to the intake manifold 22, and an air cleaner 24 is connected to the intake pipe 23. A compressor 25a of a supercharger 25 is arranged in the intake pipe 23.

An exhaust manifold 28 is connected to the cylinder head 15. An exhaust pipe 29 is connected as part of an exhaust gas passage to the exhaust manifold 28. A DPF 30 is arranged in the exhaust pipe 29. The DPF 30 includes an oxidation catalyst 30a and a catalyst-incorporated filter 30b, which is arranged at the downstream side of the oxidation catalyst 30a. The exhaust gas discharged from the cylinders 11, 12, 13, and 14 are emitted into the atmosphere via the exhaust manifold 28, the exhaust pipe 29, a turbine 25b of the supercharger 25, and the DPF 30.

The pressure difference sensor 40 detects the pressure difference $\Delta P$ between the upstream side and downstream side of the DPF 30. The pressure difference $\Delta P$ is a value that is in accordance with the amount of particulate matter (PM) accumulated in the DPF 30. In other words, the pressure difference sensor 40, which serves as an accumulated amount detector, detects the amount of accumulated matter in the DPF 30. Further, a temperature sensor 41 detects an inlet gas temperature Tfin of the DPF 30.

The ECU 50 includes a central processing unit (CPU) 51 and a memory 52. The ECU 50 receives a signal from the temperature sensor 41. The ECU 50 also receives signals from other sensors. Based on these signals, the CPU 51 determines an intake temperate Tain, an engine speed Ne, an acceleration depression amount $\theta$, and an engine coolant temperature TW. The ECU 50 further receives a starter switch signal.

An automatic regeneration enable indication lamp 60, a manual regeneration instruction lamp 61, and a manual regeneration switch 62 are connected to the ECU 50.

The CPU 51 calculates a fuel injection amount based on the acceleration pedal depression amount $\theta$ and the engine speed Ne and injects fuel accordingly from the fuel injection nozzles 16, 17, 18, and 19. The fuel injection amount is an ECU command value reflecting the engine torque.

The fuel injection nozzles 16, 17, 18, and 19 and the oxidation catalyst 30a form an exhaust gas temperature raising unit, which raises the exhaust gas temperature by performing post injection when the diesel engine is undergoing in-cylinder fuel injection control. The CPU 51 configuring a forcible regeneration control unit controls the fuel injection nozzles 16, 17, 18, and 19 to perform post injection that raises the exhaust temperature and forcibly burns the accumulated matter to regenerate the DPF 30. When the accumulated amount detected by the pressure difference sensor 40 (accumulated amount detector) is greater than a manual regeneration specified value, the CPU 51 uses the manual regeneration instruction lamp 61 serving as a manual regeneration instruction unit to prompt the driver to perform a forcible regeneration control operation, that is, operate the forcible regeneration control unit.

The operation of the diesel engine exhaust gas purification apparatus will now be discussed.

Figure 2:
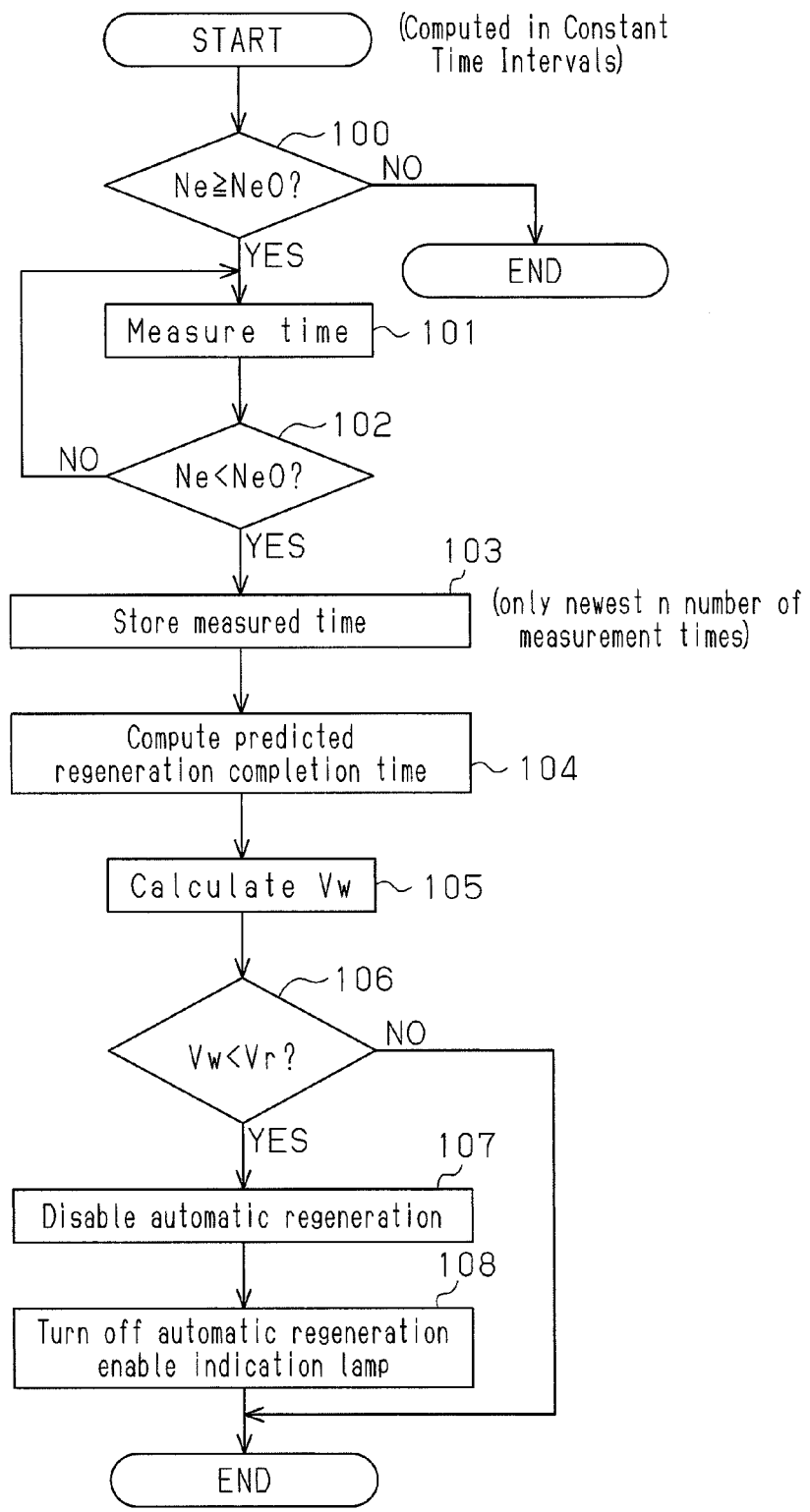
FIGS. 2 and 3 are flowcharts showing the operation of the purification apparatus of FIG. 1.
Figure 3:
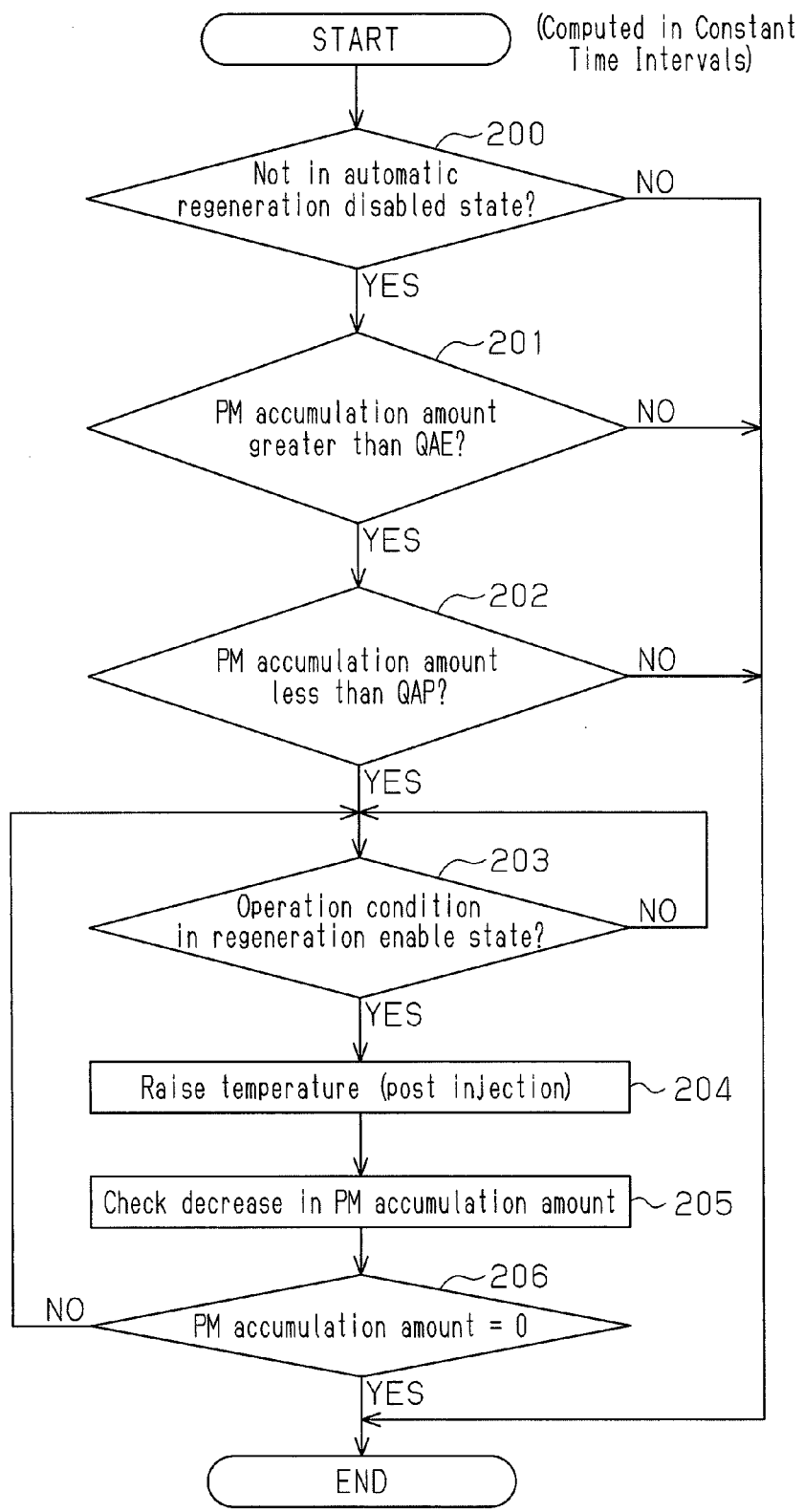
Figure 4:
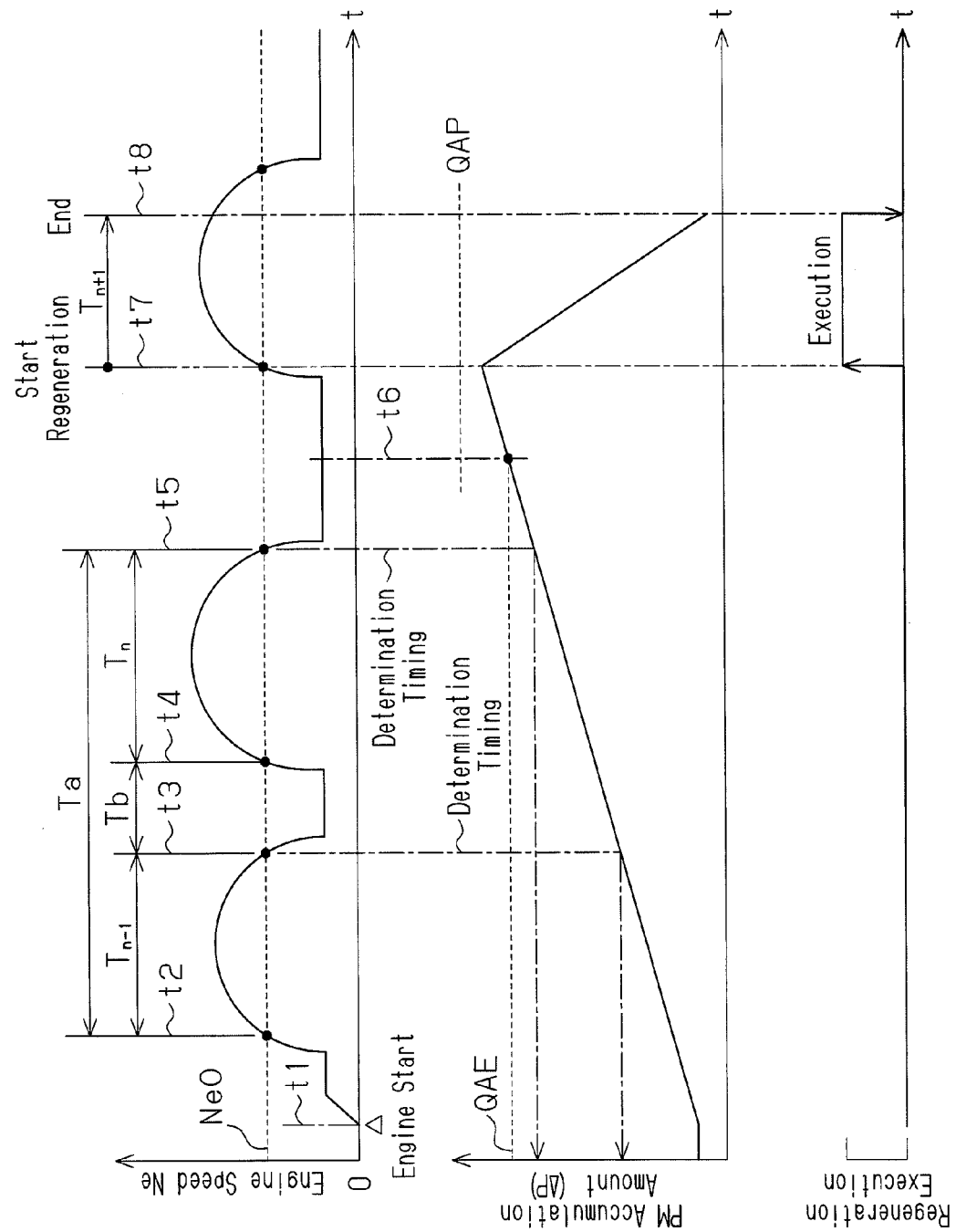
FIG. 4 is a time chart showing the operation of the purification apparatus of FIG. 1.

FIGS. 2 and 3 are flowcharts of routines executed by the CPU 51. FIG. 4 is a time chart showing the operation.

Figure 7:
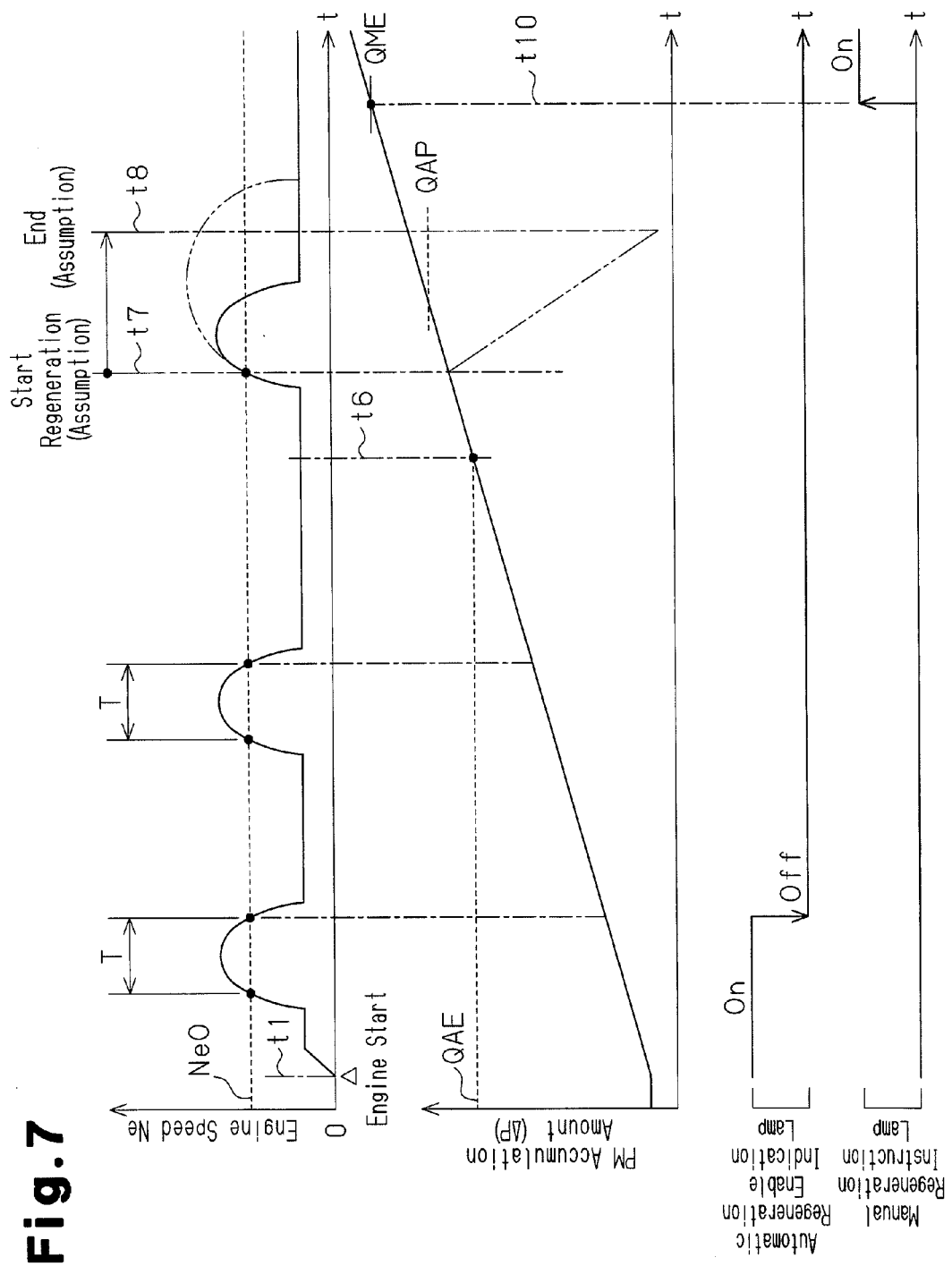
FIG. 7 is a time chart showing the operation of the purification apparatus of FIG. 1.

FIG. 4 shows the transition of the engine speed Ne, the transition of the PM accumulation amount, and whether or not regeneration is performed. In FIG. 4, t1 is the timing at which the engine is started. FIG. 4 shows a situation in which operation of the engine increases the PM accumulation amount, and regeneration decreases the PM accumulation amount. Further, FIG. 4 shows a case in which automatic regeneration is performed. FIG. 7 shows a case in which automatic regeneration is not performed.

Referring to FIG. 2, in step 100, the CPU 51 determines whether or not the engine speed Ne is greater than a specified value NeO. When the engine speed Ne is greater than the specified value NeO (timing t2 in FIG. 4), in step 101, the CPU 51 starts time measurement. The specified value NeO is, for example, 1000 rpm. In step 102, the CPU 51 determines whether or not the engine speed Ne is less than the specified value NeO. When the engine speed Ne is not less than the specified value NeO, the CPU 51 returns to step 101 and continues to measure time. In step 102, when the engine speed Ne is less than the specified value NeO (timing t3 in FIG. 4), the CPU 51 proceeds to step 103.

Figures 5, 6:
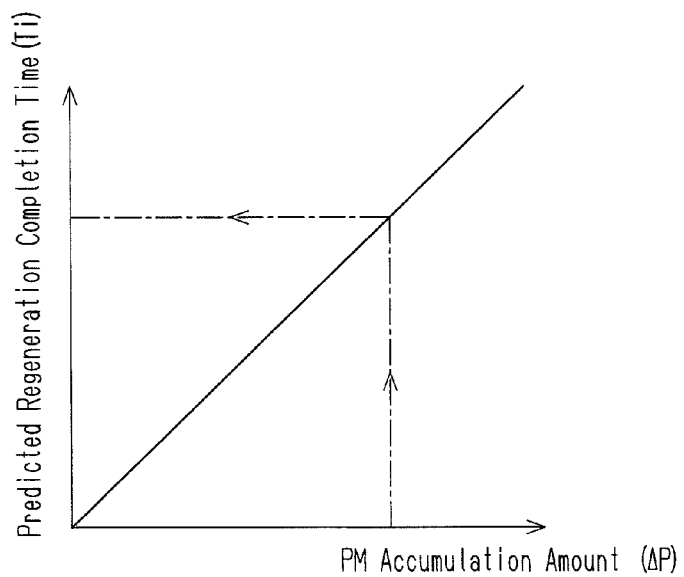
FIG. 5 is a map for obtaining a predicted regeneration completion time from the PM accumulation amount in the purification apparatus of FIG. 1.
FIG. 6 is a table of measured times, the predicted regeneration completion time, and the like showing the operation of the purification apparatus of FIG. 1.

In step 103, the CPU 51 stores the measured time in a memory 52. With reference to FIG. 6, n number of measured times are stored in the memory 52. The n number of measured times are the measured times for the present cycle, the previous cycle, the cycle before the previous cycle, and so on. In FIG. 6, the measured time in the present cycle is expressed by $T_n$, the measured time in the previous cycle is expressed by $T_{n-1}$, the measured time in the cycle before the previous one is expressed by $T_{n-2}$, and the measured time in n cycles before the present one is expressed by T1.

The CPU 51 stores only the newest n number of measured times. More specifically, after storing the data of an n number of measured times, the CPU 51, which takes into account that the working location or driver may change, updates the measured time data by deleting old data and updating it with new data. The n number is, or example, ten to twenty, and the value of n is set taking into account that the driver (operator) and travel area (working area) may change.

In the same manner, the CPU 51 measures the time from when the engine speed Ne becomes greater than the specified value NeO at timing t4 in FIG. 4 to when the engine speed Ne becomes less than the specified value NeO at timing t5. Then, the CPU 51 stores the measured time as automatic regeneration enable time in the memory 52.

In this manner, the CPU 51 measures the automatic regeneration enable time in which an automatic regeneration condition for regenerating the DPF 30 is satisfied during operation of the diesel engine 10.

Subsequently, in step 104 of FIG. 2, the CPU 51 computes a predicted regeneration completion time. In other words, the CPU 51 computes the time required to complete regeneration (predicted regeneration completion time). The predicted regeneration completion time is calculated from the present PM accumulation amount using a map shown in FIG. 5 indicating the relationship between the PM accumulation amount detected from the pressure difference sensor 40 and the predicted regeneration completion time. The map of FIG. 5 is obtained beforehand through experiments, and the time required for regeneration is obtained in accordance with the PM accumulation amount. The calculated predicted regeneration completion time is stored in the memory 52. In FIG. 6, the predicted regeneration completion time is expressed by Ti.

Then, in step 105 of FIG. 2, the CPU 51 calculates a regeneration enablement ratio Vw. This process will now be described with reference to FIG. 6. When the comparison result of the present measured time $T_n$ and the predicted regeneration completion time Ti satisfies $T_n \geq Ti$, an evaluation indicated by a cross (x) is given in FIG. 6. On the other hand, when the comparison result satisfies $T_n < Ti$, an evaluation indicated by a circle (o) is given. In FIG. 6, the previous cycle having the comparison result of $T_{n-2} \geq Ti$ is given the evaluation indicated by a cross. The cycle before the previous one having the comparison result of $T_{n-2} < Ti$ is given the evaluation indicated by a circle. The CPU 51 calculates the ratio of the crosses among the n number of relationships between the measured times and the predicted regeneration completion time Ti to obtain the regeneration enablement ratio Vw (x/n).

In step 106 of FIG. 2, the CPU 51 determines whether or not the regeneration enablement ratio Vw is less than a specified value Vr (predetermined value that is, for example, 0.8 in FIG. 6).

In this manner, the CPU 51 determines whether or not there is a high probability of a regeneration being completed without being interrupted during a single period in which the automatic regeneration condition is continuously satisfied. More specifically, the CPU 51 calculates the predicted regeneration completion time Ti required for regeneration in accordance with the present accumulated amount and compares the predicted regeneration completion time Ti with the present automatic regeneration enable time. When the probability of the present automatic regeneration enable time being longer than the predicted regeneration completion time Ti is higher than the specified value Vr, the CPU 51 determines that there is a high probability of a regeneration being completed without being interrupted during a single period in which the automatic regeneration condition is continuously satisfied.

When determining that the regeneration enablement ratio Vw is less than the specified value in step 106 of FIG. 2, the CPU 51 proceeds to step 107 and disables automatic regeneration. In step 108, the CPU 51 turns off the automatic regeneration enable indication lamp 60. When determining that the regeneration enablement ratio Vw is greater than or equal to the specified value Vr in step 106, the CPU 51 bypasses steps 107 and 108.

Referring to FIG. 3, in step 200, the CPU 51 determines whether the engine is not in an automatic regeneration disable state. When determining that the engine is not in an automatic regeneration disable state, the CPU 51 proceeds to step 201 and determines whether or not the PM accumulation amount is greater than an automatic regeneration execution condition specified value QAE. When the PM accumulation amount is greater than the specified value QAE, the CPU 51 proceeds to step 202 and determines whether or not the PM accumulation amount is less than an automatic regeneration prohibition condition specified value QAP. When the PM accumulation amount is less than the specified value QAP, the CPU 51 proceeds to step 203 and determines whether or not the engine is operating in a state that enables regeneration. More specifically, the CPU 51 determines whether or not the engine speed Ne is greater than or equal to a predetermined value. When the engine is operating in a regeneration enable state, the CPU 51 proceeds to step 204 and executes automatic regeneration control.

In this manner, when the engine is operating in a state that is not an automatic regeneration disable state, the PM accumulation amount is greater than the specified value QAE, the PM accumulation amount is less than the specified value QAP, and the engine is operating in a regeneration enable state in steps 200 to 203, the CPU 51 executes automatic regeneration control in steps 203 to 206.

When a negative determination is given in step 106 of FIG. 2 and the CPU 51 determines to enable automatic regeneration, an affirmative determination is thereafter given in step 200 of FIG. 3. At timing t6 in FIG. 4, when the PM accumulation amount becomes greater than the specified value QAE, an affirmative determination is given in step 201 of FIG. 3. When the PM accumulation amount is less than the specified value QAP, a negative determination is given in step 202 of FIG. 3. Further, when the engine speed Ne becomes greater than the specified value NeO at timing t7 in FIG. 4, that is, when the starting of the next cycle $T_{n+1}$ (or new Tn), an affirmative determination is given in step 203 of FIG. 3. When the engine speed Ne is not greater than the specified value NeO, a negative determination is given in step 203 of FIG. 3. Thus, this step is repeated until the engine speed Ne becomes greater than the specified value NeO. Then, the CPU 51 proceeds to step 204 and executes automatic regeneration control.

During the execution of automatic regeneration control, the CPU 51 performs post injection when in-cylinder fuel injection control is being performed on the diesel engine 10. This raises the exhaust gas temperature to forcibly burn the accumulated matter and regenerate the DPF 30. More specifically, multi-injection is performed to raise the temperature of the exhaust gas. Then, post injection is performed to burn the oxidation catalyst with the fuel in the exhaust gas. Further, the temperature of the exhaust gas is raised to a PM combustion temperature or greater so as to burn and eliminate PM.

In this manner, when there is a probability of a regeneration being completed without being interrupted during a single period in which the automatic regeneration condition is continuously satisfied, the CPU 51 performs automatic generation while the forklift is traveling or operating (working).

In step 205 of FIG. 3, the CPU 51 checks the decrease in the PM accumulation amount with a monitor (not shown). Execution of the automatic regeneration control decreases the PM accumulation amount. In step 206, the CPU 51 determines whether the PM accumulation amount is null (zero).

When an affirmative determination is given in step 206, the CPU 51 ends the automatic regeneration. When the PM accumulation amount is more than zero, that is, when a negative determination is given in step 206, the CPU 51 proceeds to step 203 of FIG. 3 and determines whether or not the engine is operating in a regeneration enable state.

As shown in FIG. 7, when the CPU 51 determines that the regeneration enablement ratio Vw is smaller than the specified value Vr in step 106 of FIG. 2, the CPU 51 determines to disable automatic regeneration in step 107 and turns off the automatic regeneration enable indication lamp 60 in step 108. In this case, automatic regeneration is not performed. When the PM accumulation amount becomes greater than the specified value QAE at timing t6 and reaches the manual regeneration specified value QME at timing t10, the CPU 51 turns on the manual regeneration instruction lamp 61. In this manner, when the probability of a regeneration being completed without being interrupted becomes high during a single period in which the automatic regeneration condition is continuously satisfied, the CPU 51 performs a process for prompting the driver to execute a forcible regeneration control operation.

When the manual regeneration instruction lamp 61 is turned on, the driver pushes the manual regeneration switch 62 when the vehicle stops traveling or stops working (operating). In response, the CPU 51 executes regeneration control.

In this manner, when the probability of a regeneration being completed without being interrupted is high during a single period in which the automatic regeneration condition is continuously satisfied, the CPU 51 executes a control for completing a regeneration performed when the vehicle is traveling or operating without being interrupted. When determining that the probability of a regeneration being completed without being interrupted is low during a single period in which the automatic regeneration condition is continuously satisfied, the CPU 51 executes a control for prompting the operator to perform forcible regeneration (manual regeneration). Thus, the determination for switching controls is accurately made based on the operation state of the diesel engine.

The above-discussed embodiment has the advantages described below.

(1) The CPU 51 of the ECU 50 measures the automatic regeneration enable time during which the automatic regeneration condition for regenerating the DPF 30 (regenerative diesel particulate filter) is satisfied when the diesel engine 10 is operating. Based on the automatic regeneration enable time, the CPU 51 further determines whether or not the probability of a regeneration being completed without being interrupted is high during a single period in which the automatic regeneration condition is continuously satisfied. When the probability of regeneration being completed is high, the CPU 51 performs automatic regeneration while the vehicle is traveling or operating. However, when the probability of regeneration being interrupted is high, the CPU 51 performs a process for prompting the driver to operate the CPU 51 (forcible regeneration control unit) with the manual regeneration switch 62.

Figure 11:
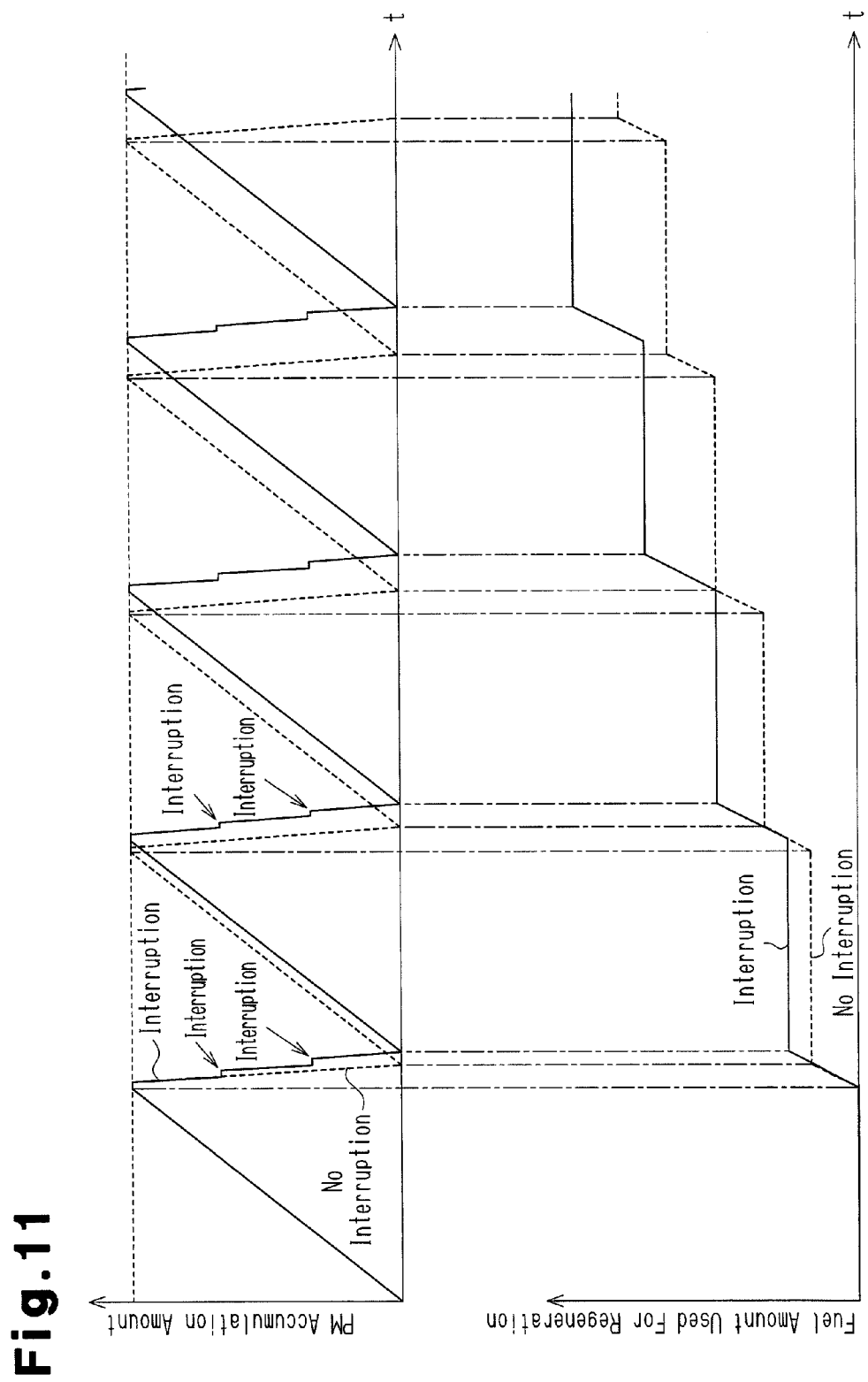
FIG. 11 is a graph showing the transition of the PM accumulation amount and the fuel amount used for regeneration.

In this manner, the CPU 51 uses the past operation data to predict whether the probability of regeneration being interrupted is low. Then, when the probability of regeneration being interrupted is low, the CPU 51 performs automatic regeneration. This allows for an automatically performed regeneration to be completed at once without being interrupted when the vehicle is traveling or operating. As described with reference to FIG. 11, interruption of automatic regeneration when the vehicle is traveling or operating would increase the time required to raise the temperature of the exhaust gas to the temperature that actually burns and oxidizes PM. This would require additional energy and lower fuel efficiency (increase fuel consumption). However, the present embodiment eliminates such interruptions and thus does not require additional energy thereby decreasing fuel consumption. In other words, the present embodiment allows for automatic regeneration to be completed without lowering fuel efficiency. Further, the present system that uses post injection to perform regeneration prolongs the time in which post-injected unburned fuel causes oil dilution to reach its limit.

(2) In further detail, to determine whether or not the probability is high for a regeneration to be completed without being interrupted during a single period in which the automatic regeneration condition is continuously satisfied, the CPU 51 of the ECU 50 calculates the predicted regeneration completion time required for regeneration in accordance with the present accumulated amount. The CPU 51 compares the predicted regeneration completion time with the present automatic regeneration enable time. When the probability of the present automatic regeneration enable time being longer than the predicted regeneration completion time is higher than the specified value Vr, the CPU 51 determines that the probability is high for a regeneration to be completed without being interrupted during a single period in which the automatic regeneration condition is continuously satisfied. This allows for accurate determination of whether or not the probability is high for a regeneration to be completed without being interrupted during a single period in which the automatic regeneration condition is continuously satisfied.

It should be apparent to those skilled in the art that the present invention may be embodied in many other specific forms without departing from the spirit or scope of the invention. Particularly, it should be understood that the present invention may be embodied in the following forms.

In the above-discussed embodiment, the map of FIG. 5 is used to compute the predicted regeneration completion time from the PM accumulation amount. However, the time required for completing regeneration of a predetermined fixed amount, such as a regeneration initiating amount, may be used as a predicted regeneration completion time.

In the above-discussed embodiment, the time during which the engine speed Ne is continuously greater than or equal to the specified value NeO is measured to determine disablement of automatic regeneration. Instead, the time during which the DPF inlet gas temperature is continuously greater than or equal to a predetermined value may be measured to determine disablement of automatic regeneration. Alternatively, the time during which the coolant temperature in the engine or at the outlet of the engine is continuously greater than or equal to a predetermined value may be measured to determine disablement of automatic regeneration. Further, the elapsed time from when the engine is started may be measured to determine disablement of automatic regeneration. As another option, the time during which the injection amount (ECU command value representing torque) is continuously greater than or equal to a predetermined value may be measured to determine disablement of automatic regeneration.

In the above-discussed embodiment, the time during which a single parameter (engine speed Ne) is continuously greater than or equal to the specified value NeO is measured to determine disablement of automatic regeneration. Instead, the above five parameters (engine speed, DPF inlet gas temperature, coolant temperature inside the engine or at the outlet of the engine, and elapsed time from when engine is started)

may be combined in any manner. More specifically, the time during which the engine speed and the injection amount (ECU command value representing torque) are continuously within certain conditions (e.g., the engine speed being greater than or equal to a fixed value, and the injection amount being greater than or equal to a fixed value) may be measured to determine disablement of automatic regeneration. Alternatively, the time during which the engine speed and the DPF inlet gas temperature are continuously greater than or equal to predetermined values may be measured to determine disablement of automatic regeneration. Further, the time during which the engine speed and either one of the DPF inlet gas temperature and the coolant temperature inside (or at the outlet of) the engine are continuously greater than or equal to predetermined values may be measured to determine disablement of automatic regeneration. As another option, the time during which the engine speed, the DPF inlet gas temperature, and the coolant temperature inside (or at the outlet of) the engine are continuously greater than or equal to predetermined values may be measured to determine disablement of automatic regeneration.

In the above-discussed embodiment, the time during which a parameter (engine speed Ne) is greater than or equal to the specified value NeO is measured. Instead, the time during which a parameter is outside a specified range may be included and measured continuously as the continuous time as long as the parameter is outside the specified range for just a short period. That is, when the parameter goes outside the specified range for a short period (two to ten minutes) and then returns the specified range, such period may also be continuously measured.

Figure 8:
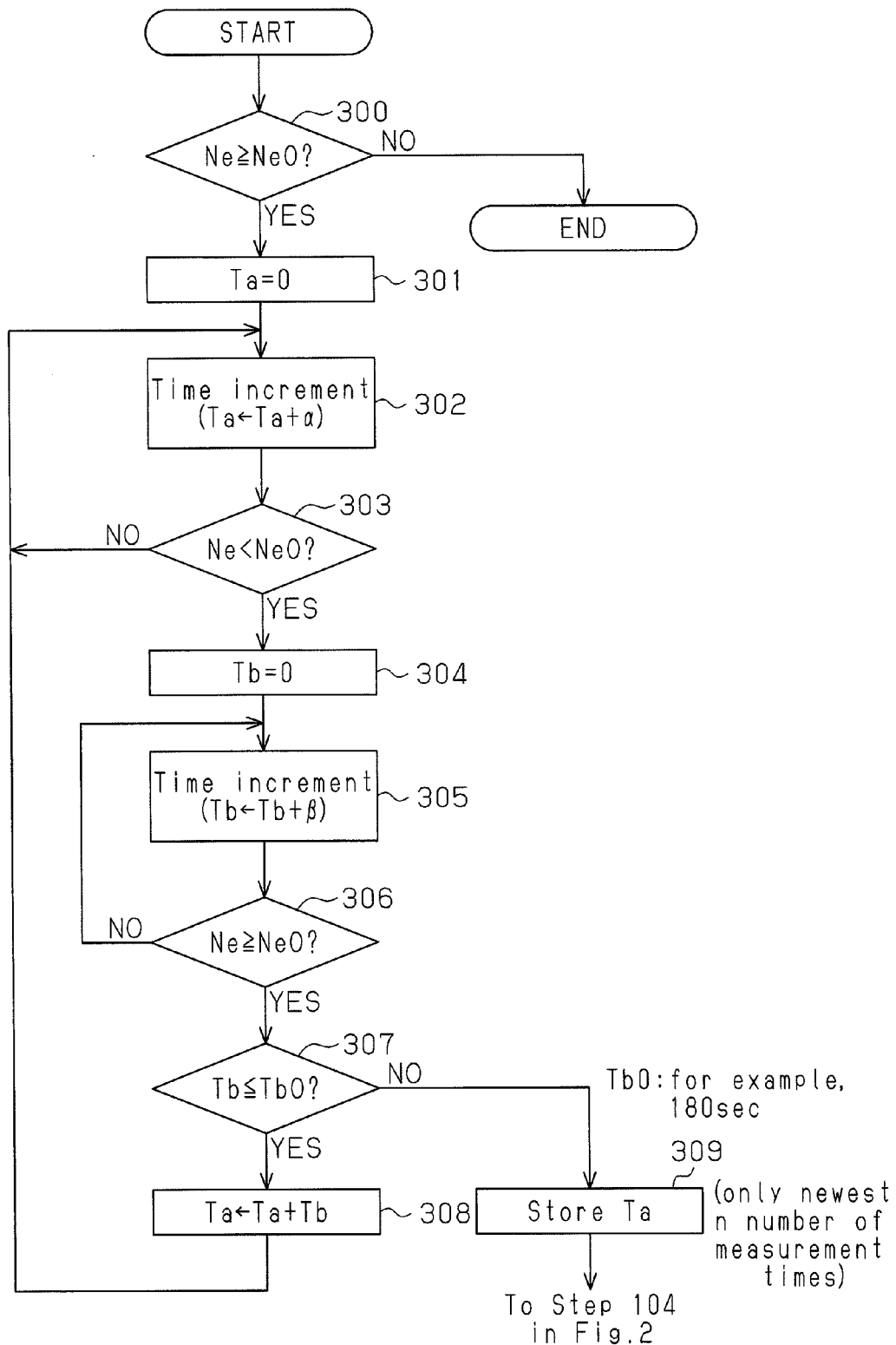
FIG. 8 is a flowchart showing the operation in another example.

FIG. 8 shows a flowchart of a routine that continuously measures the time during which a parameter goes outside a specified range but returns to the range within a short period.

In FIG. 8, when the engine speed Ne becomes greater than the specified value NeO in step 300, the CPU 51 of the ECU 50 sets the time (count value) Ta (e.g., the time from t2 to t5 in FIG. 4) to zero in step 301 and performs a time increment operation in step 302. In step 303, when the engine speed Ne is not less than the specified value NeO, the CPU 51 returns to step 302. When the engine speed Ne becomes less than the specified value NeO in step 303, the CPU 51 sets the time (count value) Tb (e.g., the time from t3 to t4 in FIG. 4) to zero in step 304 and performs a time increment operation in step 305. When the engine speed Ne is less than the specified value NeO in step 306, the CPU 51 returns to step 305. When the engine speed Ne becomes greater than the specified value NeO in step 306, the CPU 51 determines in step 307 whether or not a continuous time Tb during which the engine speed Ne is less than the specified value NeO is less than or equal to a specified value TbO (e.g., 180 seconds). When the continuous time Tb is less than or equal to the specified value TbO, the CPU 51 proceeds to step 308 and sets the sum of time Ta and time Tb as the time Ta. When the continuous time Tb is greater than the specified value in step 307, the CPU 51 proceeds to step 309 and stores the time Ta.

Figure 9:
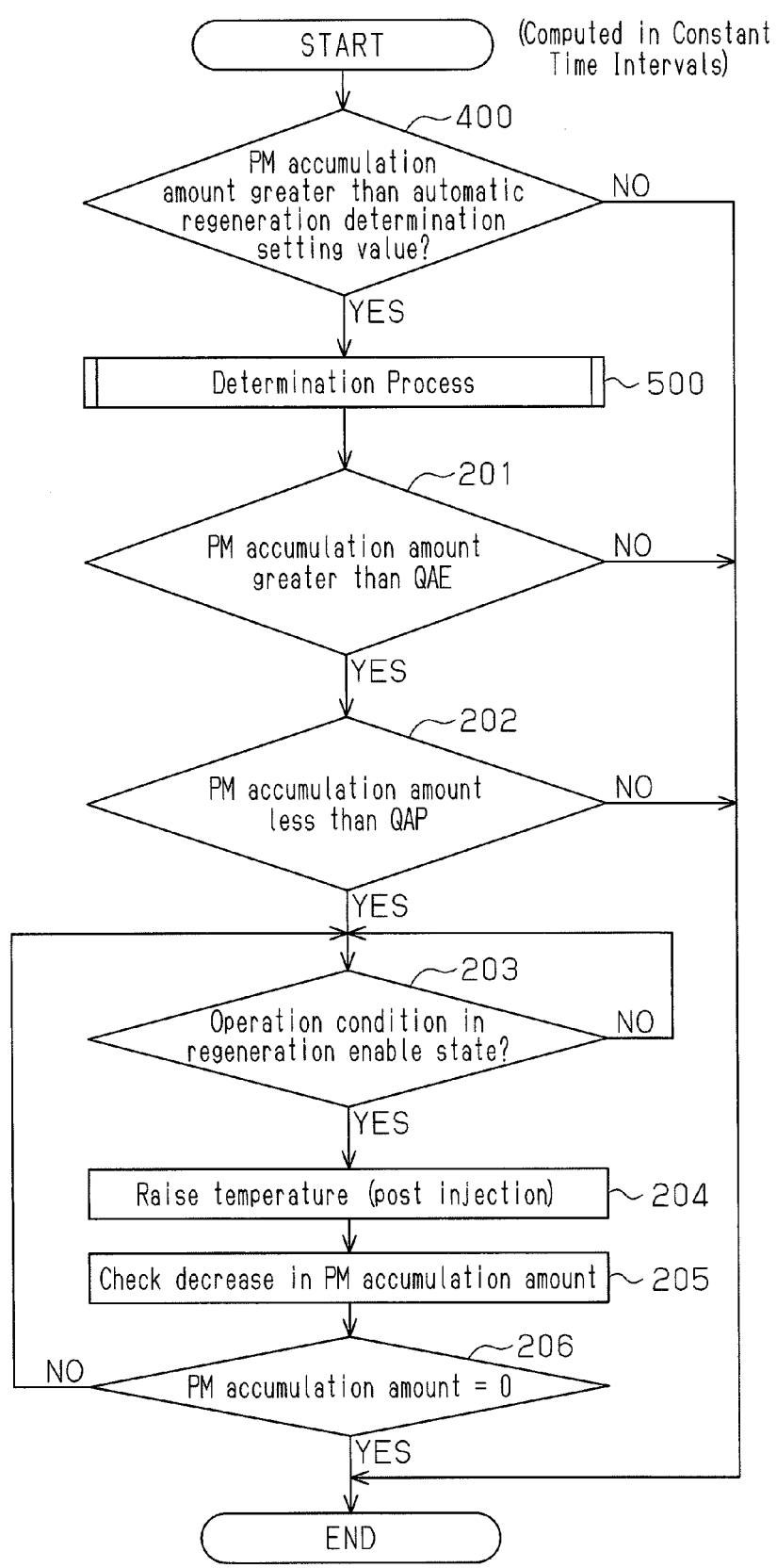
FIG. 9 is a flowchart showing the operation in another example.
Figure 10:
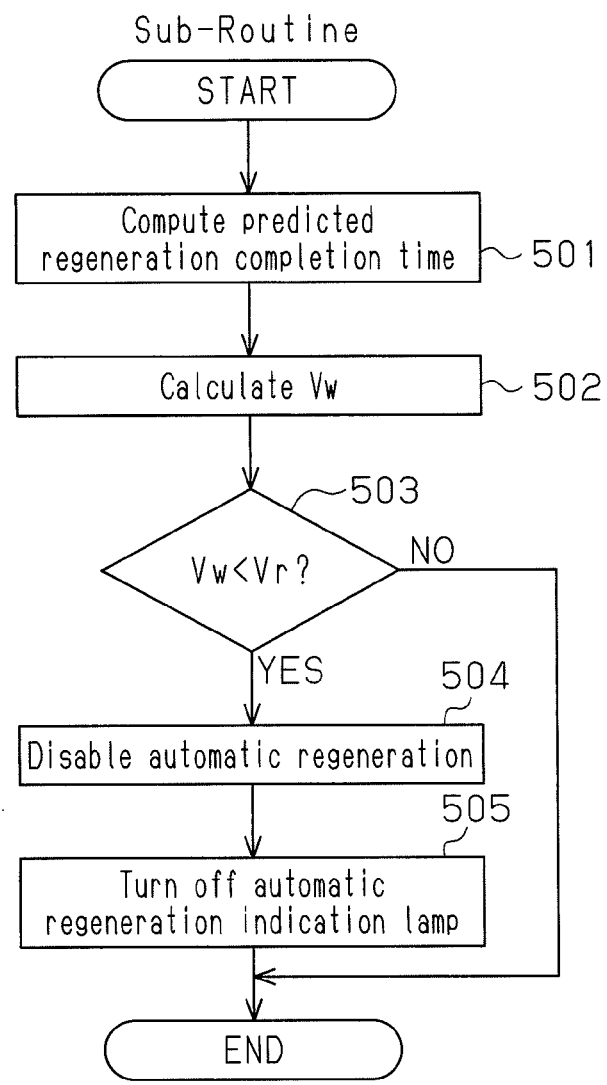
FIG. 10 is a flowchart showing the operation in another example.

In the above-discussed embodiment, the processes of steps 104 to 108 of FIG. 2 are performed at timings t3 and t5 in FIG. 4, which are when the engine speed Ne goes outside the range defined by the specified value NeO. That is, at these timings, the computation of the predicted regeneration completion time Ti, the calculation of the regeneration enablement ratio Vw, and the comparison of the regeneration enablement ratio Vw and the specified value Vr are performed. Instead, processes corresponding to steps 104 to 108 of FIG. 2 may be performed at timing t6 of FIG. 4, which is when regeneration should be performed. Alternatively, processes corresponding to steps 104 to 108 of FIG. 2 may be performed when the PM accumulation amount becomes greater than a predetermined value (before timing t6 of FIG. 4). FIGS. 9 and 10 show one such example. In FIG. 9, the CPU 51 of the ECU 50 in step 400 determines whether or not the PM accumulation amount is greater than an automatic regeneration determination setting value. When the PM accumulation amount is greater than the automatic regeneration determination setting value, the CPU 51 proceeds to step 500. As the determination process of step 500, the CPU 51 executes the processing shown in FIG. 10. More specifically, in step 501, the CPU 51 computes the predicted regeneration completion time. In step 502, the CPU calculates the regeneration enablement ratio Vw. In step 503, the CPU 51 determines whether or not the regeneration enablement ratio Vw is less than the specified value Vr. When the regeneration enablement ratio Vw is less than the specified value Vr, the CPU 51 proceeds to step 504 and disables automatic regeneration. Then, in step 505, the CPU 51 turns off the automatic regeneration enable indication lamp 60.

Subsequently, the CPU 51 performs the processes of steps 201 to 206 of FIG. 9. These processes are the same as those of steps 201 to 206 in FIG. 3.

The sub-routine of FIG. 10 is performed between steps 400 and 201 in FIG. 9. Instead, the sub-routine may be performed between steps 201 and 202, steps 202 and 203, or steps 203 and 204.

In the above-discussed embodiment, the regeneration enablement rate Vw is calculated in step 105 of FIG. 2 to determine whether or not to disable automatic regeneration. More specifically, as shown in FIG. 6, the relationship of the measured time and predicted regeneration completion time is determined. Further, such determination is performed for an n number of times as for the present cycle, the previous cycle, the cycle before the previous cycle, and so on. Then, the ratio of the same relationship is calculated, and the ratio is compared with the specified value Vr to determine whether or not to disable automatic regeneration. Instead, the average value of the n measured times, which in FIG. 6 is $(T_n+T_{n-1}+T_{n-2}+\ldots+T1)/n)$, may be calculated, and the average time average value may be compared with a predicted regeneration completion time to determine to disable automatic regeneration when the measured time average value is shorter than the predicted regeneration completion time. More specifically, the CPU 51 may obtain the average value of the automatic regeneration enable times measured in time sequence, compare the measured time average value with the predicted regeneration completion time, and determine to disable automatic regeneration when the measured time average value is shorter than the predicted regeneration completion time. In this manner, the CPU 51 may obtain the average value of the automatic regeneration enable times that are measured in time sequence and determine that the probability is high for a regeneration being completed without being interrupted during a single period in which the regeneration condition is continuously satisfied when the average time is longer than the predicted regeneration completion time required to perform regeneration in accordance with the accumulated amount.

In the above-discussed embodiment, when the predetermined condition is satisfied in step 106 of FIG. 2, that is, when the regeneration enablement ratio Vw is less than the specified value Vr, automatic regeneration is disabled (prohibited) in step 107. Instead, when a predetermined condition (automatic regeneration condition) is satisfied, automatic regeneration may be enabled. More specifically, for example, as the process of step 106 in FIG. 2, the CPU 51 may determine whether the regeneration enablement ratio Vw is greater than the specified value Vr. When determining that the enablement ratio Vw is greater than the specified value Vr, the CPU 51 may enable automatic regeneration and turn on the automatic regeneration enable indication lamp 60.

In the above-discussed embodiment, the present invention is applied to a forklift that is powered by a diesel engine However, the present invention is not limited in such a manner. More specifically, the present invention may be applied to transportation machinery other than a forklift and other machinery, such as construction machinery and farming machinery. The present invention may also be applied to an automobile powered by a diesel engine.

In the above-discussed embodiment, the fuel injection nozzles 16, 17, 18, and 19 are used to perform post injection. This burns the fuel in the exhaust gas at the oxidation catalyst and raises the temperature of the exhaust gas to a temperature that is higher than or equal to a PM combustion temperature to burn and eliminate PM. In other words, the fuel injection nozzles 16, 17, 18, and 19 and the oxidation catalyst 30a of the DPF 30 form the exhaust gas temperature raising unit. However, the structure of the exhaust gas temperature raising unit is not limited in such a manner. More specifically, for example, as shown in FIG. 1, a fuel adding device 71, which is arranged in the exhaust gas passage (exhaust gas manifold or exhaust pipe) upstream from the DPF 30, and the oxidation catalyst 30a of the DPF 30 may form the exhaust gas temperature raising unit. Alternatively, a burner 72, which is arranged in the exhaust gas passage (exhaust gas manifold or exhaust pipe) upstream from a regenerative diesel particulate filter (with no catalyst), may form the exhaust gas temperature raising unit. As another option, a plurality of such exhaust gas temperature raising units may be used and controlled as required in accordance with the operation state of the engine.

The present examples and embodiments are to be considered as illustrative and not restrictive, and the invention is not to be limited to the details given herein, but may be modified within the scope and equivalence of the appended claims.

What is claimed is:

1. An exhaust gas purification apparatus for a diesel engine mounted on a vehicle, the exhaust gas purification apparatus comprising:
    a regenerative diesel particulate filter arranged in an exhaust gas passage of the diesel engine;
    an accumulated amount detector configured to detect an amount of accumulated matter in the filter;
    an exhaust gas temperature raising unit configured to raise a temperature of an exhaust gas; and
    a forcible regeneration control unit configured to:
        determine to enable or disable complete automatic regeneration;
        raise, in response to the complete automatic regeneration being enabled, the exhaust gas temperature using the exhaust gas temperature raising unit to forcibly burn the accumulated matter and regenerate the filter;
        measure, in response to the diesel engine operating, an automatic regeneration enable time being a time that satisfies an automatic regeneration condition for completely regenerating the filter;
        determine, using the automatic regeneration enable time, whether or not a probability that a regeneration will be completed without being interrupted during a single period in which the automatic regeneration condition is continuously satisfied is greater than a predetermined threshold; and
        perform, in response to the probability of regeneration being completed being greater than the predetermined threshold, the complete automatic regeneration while the vehicle is traveling or operating.

2. The exhaust gas purification apparatus according to claim 1, wherein the forcible regeneration control unit is further configured to:
    calculate a predicted regeneration completion time required to burn the accumulated matter in accordance with a present accumulated amount;
    compare the predicted regeneration completion time with a present automatic regeneration enable time; and
    determine, in response to a probability of the present automatic regeneration enable time being longer than the predicted regeneration completion time being greater than a predetermined threshold, that the probability that a regeneration will be completed without being interrupted during a single period in which the automatic regeneration condition is continuously satisfied is greater than the predetermined threshold.

3. The exhaust gas purification apparatus according to claim 1, wherein the forcible regeneration control unit is further configured to:
    calculate a predicted regeneration completion time required to burn the accumulated matter in accordance with a present accumulated amount; and
    obtain an average time of a plurality of automatic regeneration enable times measured in time sequence;
    determine, when the average time is longer than the predicted regeneration completion time required to burn the accumulated matter in accordance with the accumulated amount, that the probability that a regeneration will be completed without being interrupted during a single period in which the automatic regeneration condition is continuously satisfied is greater than the predetermined threshold.

4. The exhaust gas purification apparatus according to claim 1, wherein the exhaust gas temperature raising unit includes:
    a fuel injection nozzle configured to perform post injection, in response to the diesel engine undergoing in-cylinder fuel injection control; and
    an oxidation catalyst of the filter.

5. The exhaust gas purification apparatus according to claim 1, wherein the exhaust gas temperature raising unit includes:
    a fuel adding device arranged in the exhaust gas passage upstream from the filter; and
    an oxidation catalyst of the filter.

6. The exhaust gas purification apparatus according to claim 1, wherein the exhaust gas temperature raising unit includes:
    a burner arranged in the exhaust gas passage upstream from the filter.

7. The exhaust gas purification apparatus according to claim 1, further comprising a manual regeneration instruction unit that prompts a driver to operate the forcible regeneration control unit, in response to the accumulated amount detected by the accumulated amount detector being greater than a specified value.

8. An exhaust gas purification apparatus for a diesel engine mounted on a vehicle, the exhaust gas purification apparatus comprising:
    a regenerative diesel particulate filter arranged in an exhaust gas passage of the diesel engine;
    an accumulated amount detector configured to detect the amount of accumulated matter in the filter;
    an exhaust gas temperature raising unit configured to raise a temperature of an exhaust gas; and a forcible regeneration control unit configured to:
- determine to enable or disable complete automatic regeneration;
- raise, in response to the complete automatic regeneration being enabled, the exhaust gas temperature using the exhaust gas temperature raising unit to forcibly burn the accumulated matter and regenerate the filter;
- measure, in response to the diesel engine operating, a plurality of cycles of an automatic regeneration enable time in which an automatic regeneration condition for completely regenerating the filter is satisfied;
- determine, using the automatic regeneration enable times, whether or not a probability that a regeneration will be completed without being interrupted during a single period in which the automatic regeneration condition is continuously, satisfied is greater than a predetermined threshold; and
- perform, in response to the probability of regeneration being completed being greater than the predetermined threshold and at a start of a next cycle of the automatic regeneration enable time, the automatic regeneration while the vehicle is traveling or operating.

9. An exhaust gas purification apparatus comprising:
a filter configured to be arranged in an exhaust gas passage of an engine;
a sensor configured to detect an amount of accumulated matter in the filter; and
a controller configured to:
- determine, in response to the engine operating, whether an automatic regeneration condition exists based on whether a speed of the engine constantly exceeds a predetermined value for a time period that allows for a complete regeneration of the filter without being interrupted;
- calculate a probability, using the determination, that indicates whether a complete regeneration of the filter will be completed without being interrupted during a single period in which the automatic regeneration condition continuously exists; and
- perform, in response to the probability being greater than a predetermined threshold, a complete automatic regeneration of the filter, wherein performing the complete automatic regeneration of the filter includes causing a temperature of the exhaust gas to raise in order to forcibly burn the accumulated matter.

10. The exhaust gas purification apparatus according to claim 9, wherein the controller is further configured to:
- calculate a predicted regeneration completion time required to burn the accumulated matter in accordance with a present accumulated amount; and
- obtain an average time of a plurality of automatic regeneration enable times measured in a time sequence; and
- determine, when the average time is longer than the predicted regeneration completion time required to burn the accumulated matter in accordance with the accumulated amount, that the probability is greater than the predetermined threshold.

* * * * *